(12) United States Patent
Endo et al.

(10) Patent No.: US 8,340,696 B2
(45) Date of Patent: Dec. 25, 2012

(54) MOBILE TERMINAL DEVICE

(75) Inventors: Kosuke Endo, Tokyo (JP); Hironori Suzuki, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 13/271,589

(22) Filed: Oct. 12, 2011

(65) Prior Publication Data
US 2012/0244911 A1 Sep. 27, 2012

Related U.S. Application Data

(60) Provisional application No. 61/467,658, filed on Mar. 25, 2011.

(51) Int. Cl.
*H04W 68/00* (2009.01)
(52) U.S. Cl. ........ 455/460; 455/418; 455/566; 340/517; 340/523; 340/539.23
(58) Field of Classification Search .................. 455/418, 455/566, 460
See application file for complete search history.

(56) References Cited

U.S. PATENT DOCUMENTS

| | | | |
|---|---|---|---|
| 7,827,698 B2* | 11/2010 | Jaiswal et al. | 33/366.11 |
| 8,194,926 B1* | 6/2012 | Keysers et al. | 382/103 |
| 2008/0133580 A1* | 6/2008 | Wanless et al. | 707/102 |
| 2008/0212753 A1* | 9/2008 | Yoshizawa | 379/110.01 |
| 2011/0119641 A1* | 5/2011 | Lee | 715/863 |

FOREIGN PATENT DOCUMENTS

JP 2003-289348 10/2003

* cited by examiner

*Primary Examiner* — Kwasi Karikari
(74) *Attorney, Agent, or Firm* — Oblon, Spivak, McClelland, Maier & Neustadt, L.L.P.

(57) ABSTRACT

A mobile terminal device including a communication processor that conducts wireless communication processing, an operation unit that receives an instruction input from a user for selecting a communication contact, a displacement detector that detects a magnitude of displacement in orientation of the mobile terminal device, and a controller that causes the communication processor to conduct the wireless communication with the selected communication contact according to the detected magnitude of displacement.

14 Claims, 12 Drawing Sheets

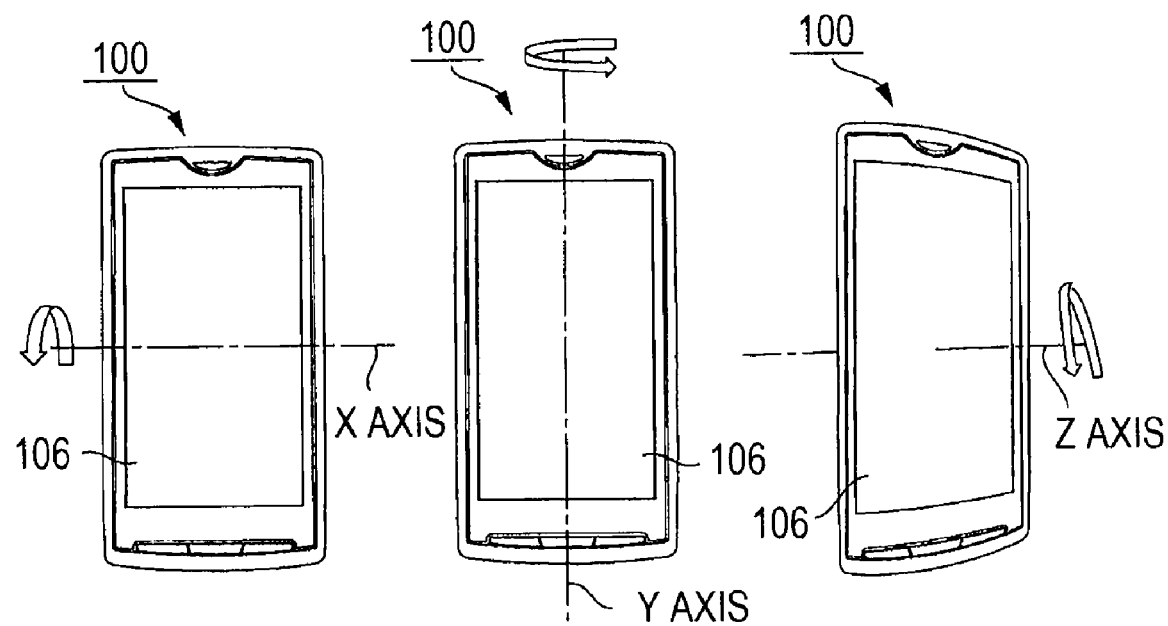

MOBILE TERMINAL DEVICE

CROSS REFERENCE TO RELATED APPLICATIONS

This application is related to and claims priority under 35 U.S.C. §119(e) to Provisional Application Ser. No. 61/467,658, filed Mar. 25, 2011, the contents of which are hereby incorporated herein by reference.

BACKGROUND

1. Field

The present specification relates to a mobile terminal device, and more particularly, to technology that reduces the steps until communication is initiated with a specific contact.

2. Description of Related Art

Hitherto, communication with a specific contact has been conducted by placing a telephony call to the specific contact using a mobile terminal device or by using a text communication tool of a mobile phone device. Known text communication tools include electronic mail, SNS (Social Network Services), and Twitter (registered trademark).

When communicating with a specific contact by telephony, an address book may be activated and a contact address for the contact may be selected from among registered contact addresses. Otherwise, a contact may be specified by utilizing an outgoing or incoming call history, a history of sent and received electronic mail, or an incoming call or electronic mail notification.

For example, consider the case of utilizing an incoming electronic mail (hereinafter also simply designated "mail") notification to call the sender of the mail. In this case, the user is required to perform steps like those given below. First, the user selects an incoming mail notification issued with a popup message, etc. and causes the received mail to be displayed. Next, the user selects an "Options" or similar menu on a screen displaying details of the incoming mail, and selects a "Call" item from a menu displayed as an options menu. Alternatively, the user presses a Call button provided on the mobile terminal device while in the state where the received mail is displayed on-screen.

In the case of utilizing an incoming mail notification to reply to a mail sender by mail, the user is required to select an "Options" menu on a screen displaying the received mail and then select "Reply to mail" from the displayed options menu.

In this way, the user is required to perform many steps, even when responding to a contact who has contacted the user him- or herself. PTL 1, in order to decrease such burdens imposed on the user, describes a technique for reducing the number of necessary steps for initiating telephony with a given contact by utilizing the slide function of a sliding mobile phone.

CITATION LIST

Patent Literature

[PTL 1] Japanese Unexamined Patent Application Publication No. 2003-289348

BRIEF SUMMARY

The Inventors have recognized the need to further decrease the steps a user must take until initiating communication in the case of using a mobile terminal device to communicate with a specific contact.

A mobile terminal device according to an embodiment includes a communication processor that conducts wireless communication processing; an operation unit that receives an instruction input from a user for selecting a communication contact; a displacement detector that detects a magnitude of displacement in orientation of the mobile terminal device; and a controller that causes the communication processor to conduct the wireless communication with the selected communication contact according to the detected magnitude of displacement Also, a communication method according to an embodiment includes receiving an instruction input from a user for selecting a communication contact; detecting a magnitude of displacement in orientation of the mobile terminal device; and causing the mobile terminal device to conduct wireless communication with the selected communication contact according to the detected magnitude of displacement.

Also, a program according to an embodiment, which when executed by a mobile terminal device, causes the mobile terminal device to perform a method including: receiving an instruction input from a user for selecting a communication contact; detecting a magnitude of displacement in orientation of the mobile terminal device; and causing the mobile terminal device to conduct wireless communication with the selected communication contact according to the detected magnitude of displacement.

According to an embodiment, wireless communication with a communication contact is automatically initiated in the case where a magnitude of displacement detected a displacement detector was within a given range while in a state where a specific communication contact has been selected. Consequently, there are fewer required steps until the initiation of communication with a specific communication contact.

BRIEF DESCRIPTION OF THE DRAWINGS

FIG. 3 is an explanatory diagram illustrating exemplary information that can be acquired by an acceleration sensor in accordance with an embodiment, with (a) being a diagram explaining rotation of a mobile phone terminal device about the X axis, (b) being a diagram explaining rotation of a mobile phone terminal device about the Y axis, and (c) being a diagram explaining rotation of a mobile phone terminal device about the Z axis.

DETAILED DESCRIPTION

Hereinafter, examples of a mobile terminal device and communication method in accordance with embodiments will be described in the following order and with reference to the drawings. Furthermore, in the example given hereinafter, an example using a mobile phone terminal as the mobile terminal device is described.

1. Exemplary configuration of mobile phone terminal device
2. Exemplary processing by controller (processing conducted until a specific contact is selected)
3. Exemplary processing by action determination unit (processing conducted after a specific contact is selected)
4. Various modifications

[1. Exemplary Configuration of Mobile Terminal Device]

Figure 1:
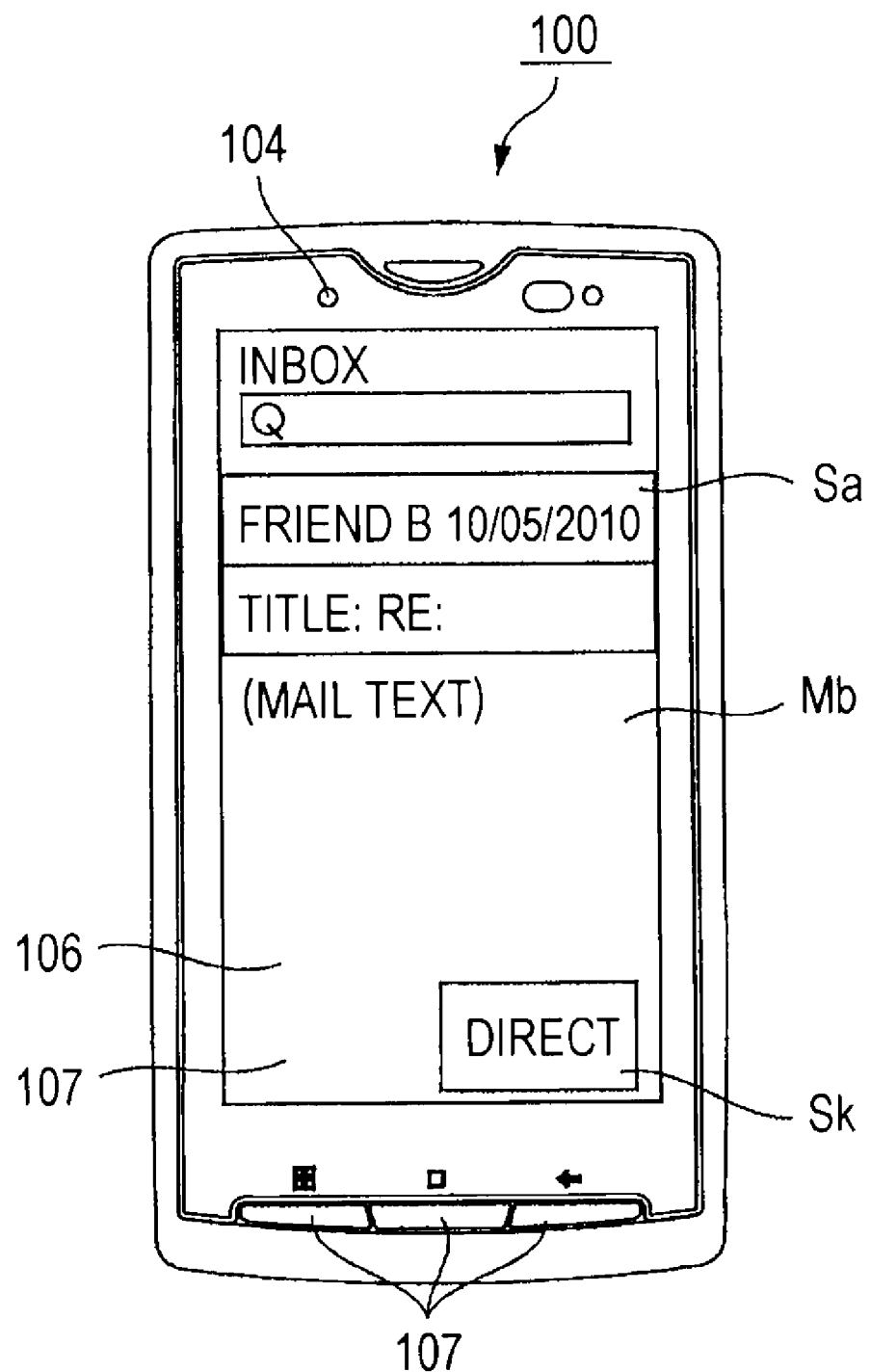
FIG. 1 is a schematic diagram illustrating an exemplary configuration of a mobile phone terminal device in accordance with an embodiment.

FIG. 1 is a schematic diagram illustrating an exemplary configuration of a mobile phone terminal device in accordance with an embodiment. A mobile phone terminal device 100 is provided with a speaker 104 that outputs an audio signal obtained by an audio processor not illustrated as audio, a display unit 106, and an operation unit 107. The display unit 106 is composed of a display panel consisting of an LCD (Liquid Crystal Display), etc., and a driving circuit, etc. (omitted from illustration) therefor. In the present embodiment, it is configured such that a touchscreen is stacked onto the display panel. In other words, the display unit 106 is configured to also function as an operation unit 107. A capacitive touchscreen, for example, may be applied as the touchscreen. The operation unit 107, besides being integrated with the display unit 106, is also composed of buttons, etc. disposed on the lower part of the mobile phone terminal device 100. In either configuration, the operation unit 107 supplies the content of user-instructed input to a controller not illustrated as an instruction signal.

FIG. 1 illustrates, as an exemplary display on the screen of the display unit 106, an example for the case where details of a received mail are displayed. Display of incoming mail is executed by mail application software (hereinafter designated an "application"). In the example illustrated in FIG. 1, the mail sender's address Sa and message Mb (displayed as "(Mail text)" in FIG. 1) are displayed as information on the incoming mail.

In the lower-right of the screen of the display unit 106 displaying an incoming mail, a software key (including an icon) Sk is displayed. Control by an action determination unit later described is initiated in the case where this software key Sk is selected (tapped) by the user. More specifically, application behavior is controlled according to the content of a user action.

In FIG. 1 herein, an example of providing a software key Sk for initiating control by an action determination unit is given, but a configuration is not limited thereto. Depending on the application type, a specific place in an area where information is displayed may also be defined as an area (specific area) equivalent to the software key Sk. In other words, an area may also be defined as an area where control by an action determination unit is initiated in the case where that area is selected. For example, in a phone book application, an area displaying a person's facial portrait (or representation) may be taken to be an area associated with control by an action determination unit. In the explanation hereinafter, such an area associated with control by an action determination unit is designated the direct communication area Da.

Figure 2:
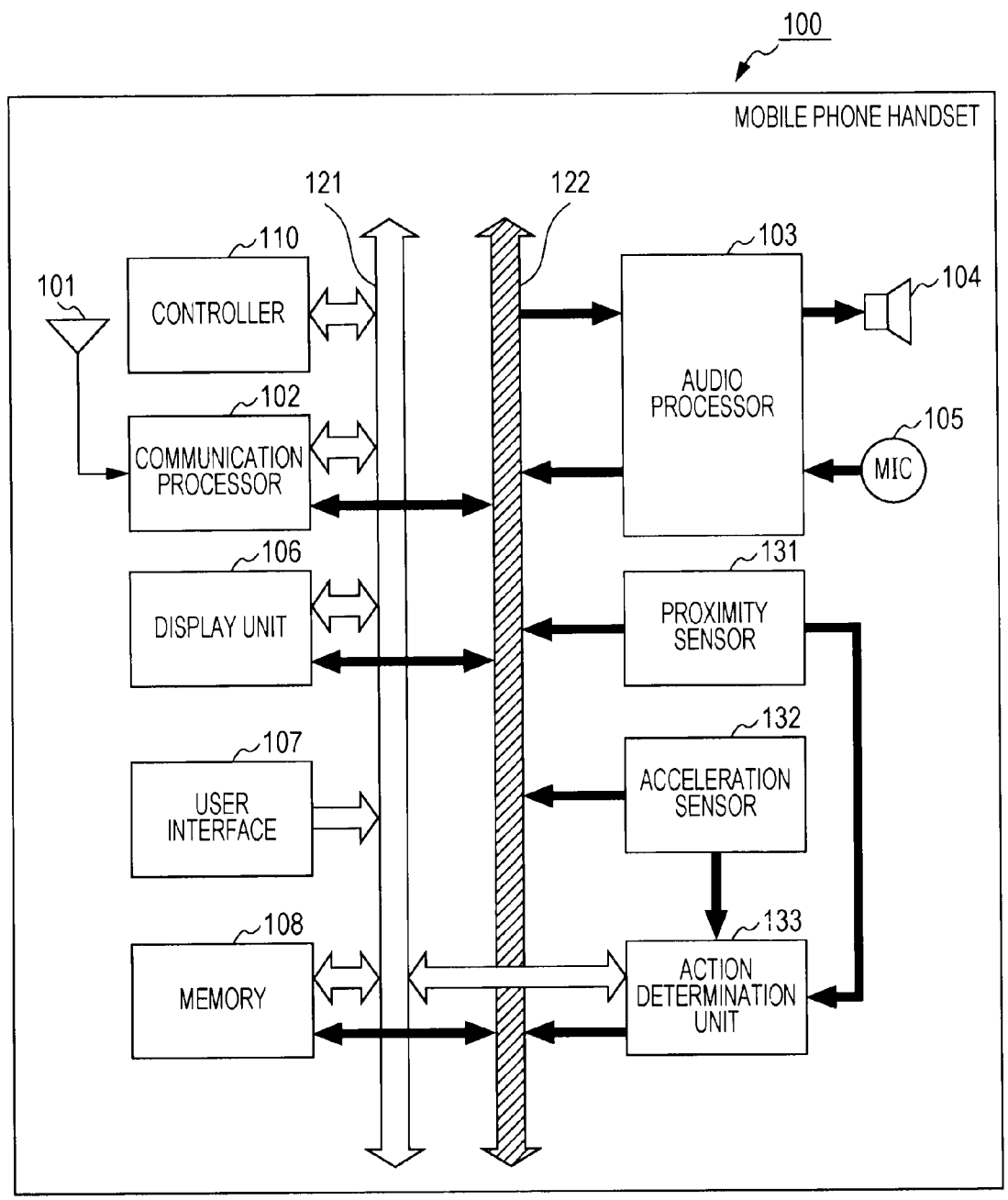
FIG. 2 is a block diagram illustrating an exemplary internal configuration of a mobile phone terminal device in accordance with an embodiment.

Next, an exemplary internal configuration of a mobile phone terminal device 100 will be explained with reference to FIG. 2. In FIG. 2, identical reference numerals are given to parts corresponding to FIG. 1, and detailed description thereof is omitted or reduced. A mobile phone terminal device 100 is provided with an antenna 101 that sends and receives radio waves to and from a wireless telephone base station, a communication processor 102 to which the antenna 101 is coupled, and a controller 110. Also provided are an audio processor 103, a speaker 104, and a microphone 105.

The communication processor 102, under control of the controller 110, conducts wireless communication with a wireless telephone base station. During audio telephony, audio data included in data received at the communication processor 102 is supplied to the audio processor 103. Then, a decoding process is conducted on the audio data by the audio processor 103 and an analog audio signal is obtained. The analog audio signal obtained by the audio processor 103 is supplied to the speaker 104 and output as audio.

An audio signal picked up by the microphone 105 is also supplied to the audio processor 103 and encoded to audio data in a given coding format by the audio processor 103. Then, the obtained audio data is supplied to the communication processor 102 and emitted as a wireless radio wave via the antenna 101.

These respective processors such as the communication processor 102 and the audio processor 103 exchange control data with the controller 110 via a control line 121, while also transmitting data via a data line 122.

The mobile phone terminal device 100 is also provided with a display unit 106 and an operation unit 107. Display by the display unit 106 is controlled by the controller 110. Various information is displayed on the display unit 106, such as information required when placing or receiving a telephone call, information such as a mail destination and message Mb, images obtained by coupling to the Internet, and information obtained while executing various functions provided in the mobile phone terminal device 100. The operation unit 107 is composed of buttons, a touchscreen, etc. as discussed earlier. The operation unit 107 generates an instruction signal in accordance with the content of an operation input from the user, and supplies the signal to the controller 110.

The controller 110 consists of a microprocessor, etc., and conducts communication control, audio processing and its control, image processing and its control, and other various signal processing and control of respective units, etc. Particularly, in the present embodiment, the controller 110 determines whether or not an action selecting a specific communication contact has been conducted by the user, on the basis of an instruction signal input from the operation unit 107. The controller 110 then supplies the determination results to an action determination unit 133 later described.

Memory 108 is coupled to the controller 110 via the control line 121 and the data line 122, and various data required by the mobile phone terminal device 100 is stored in this memory 108. Various programs such as a mail application and a telephone application are also stored in the memory 108.

The mobile phone terminal device 100 is also provided with a proximity sensor 131, an acceleration sensor 132 that acts as a displacement detector, and an action determination unit 133. The proximity sensor 131 is a sensor which detects without contact that an object (a detected object) has approached. In the case where an object is detected, such information is supplied to the controller 110. Herein, although there are various types of proximity sensors, such as a high frequency oscillation type utilizing electromagnetic induction, a magnetic type using a magnet, a capacitive type utilizing changes in electrostatic capacitance, etc., any type can be applied to the proximity sensor 131. In the present embodiment, the proximity sensor 131 is positioned near the speaker 104. In other words, in the case where the display unit 106 has approached the user's ear due to the user performing an action of placing the mobile phone terminal device 100 against his or her ear, the proximity sensor 131 is configured to be able to detect the user's ear as an object. The proximity sensor 131 in the present embodiment is also taken to be able to detect an object even in a state where the object is placed directly against the screen.

The acceleration sensor 132 acquires rotational angles about three different rotational axes of the mobile phone terminal device 100 and the instantaneous velocities of the respective rotations, and supplies the acquired data to the controller 110 and the action determination unit 133. The three different rotational axes of the mobile phone terminal device 100 refer to the X axis, Y axis, and Z axis illustrated in FIGS. 3(a) to 3(c).

The X axis, as illustrated in FIG. 3(a), refers to a line that passes through the center of the mobile phone terminal device 100, and additionally, is coplanar with the display unit 106 and bisects the lengthwise length of the mobile phone terminal device 100 (or its screen) on either side thereof. The Y axis, as illustrated in FIG. 3(b), refers to a line that passes through the center of the mobile phone terminal device 100, and additionally, is coplanar with the display unit 106 and orthogonal to the X axis. The Z axis, as illustrated in FIG. 3(c), refers to a line that passes through the center of the mobile phone terminal device 100, and additionally, forms a right angle to the screen. In other words, by means of the acceleration sensor 132, the magnitude of forward or backward tilt of the mobile phone terminal device 100 about the X axis, the magnitude of tilt about the Y axis, and the magnitude of leftward or rightward tilt about the Z axis are acquired. Herein, an example is given wherein the respective X axis, Y axis, and Z axis in the present embodiment are applied to lines that pass through the center of the mobile phone terminal device 100, but a configuration is not limited thereto. In other words, it may also be configured such that lines not passing through the center of the mobile phone terminal device 100 are taken to be the X axis, Y axis, and Z axis, and rotational angles for rotation about the respective axes and the instantaneous velocities of the rotations may be acquired.

The action determination unit 133 infers the user's action on the basis of the content of user-instructed input that was input by the operation unit 107, data detected by the proximity sensor 131, and data acquired by the acceleration sensor 132. Application behavior is then controlled on the basis of the inference information.

More specifically, communication by the communication processor 102 (see FIG. 2) is made to be executed in the case where it is determined that the user has performed an action of bringing the mobile phone terminal device 100 close to his or her ear while in a state where information regarding a specific communication contact is selected. The determination of whether or not this "action of bringing the mobile phone terminal device 100 close to his or her ear" has been performed is determined on the basis of detection results from the proximity sensor 131 and data acquired by the acceleration sensor 132. In the present embodiment, an object is first detected by the proximity sensor 131, and then a determination is made using data acquired by the acceleration sensor 132.

Figures 4A, 4B, 4C, 4D:
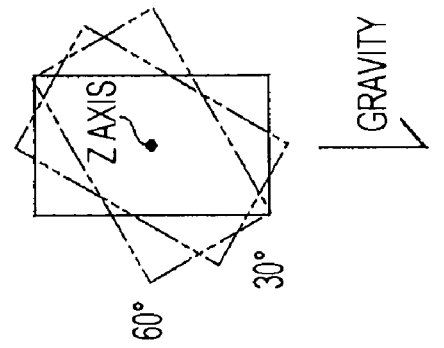
FIG. 4 is an explanatory diagram illustrating exemplary threshold values provided with respect to acquired information of an acceleration sensor in the case of initiating telephony by using acquired information of an acceleration sensor in accordance with an embodiment, with (a) illustrating exemplary threshold values provided with respect to rotation of a mobile phone terminal device about the X axis in the case of supposing that the mobile phone terminal device is positioned near the user's left ear, (b) illustrating exemplary threshold values provided with respect to rotation of a mobile phone terminal device about the X axis in the case of supposing that the mobile phone terminal device is positioned near the user's right ear, (c) illustrating exemplary threshold values provided with respect to rotation of a mobile phone terminal device about the Z axis in the case of supposing that the mobile phone terminal device is positioned near the user's left ear, and (d) illustrating exemplary threshold values provided with respect to rotation of a mobile phone terminal device about the Z axis in the case of supposing that the mobile phone terminal device is positioned near the user's right ear.

FIG. 4 illustrates exemplary threshold values provided with respect to acquired data output from the acceleration sensor 132. FIGS. 4(a) and 4(b) illustrate exemplary threshold values provided with respect to rotation of the mobile phone terminal device 100 about the X axis. FIG. 4(a) illustrates an exemplary case where absolute angles from 10° to −20° about the X axis with respect to the gravity direction are set as threshold values. FIG. 4(b) illustrates an exemplary case where absolute angles from 20° to −10° about the X axis with respect to the gravity direction are set as threshold values.

FIGS. 4(c) and 4(d) illustrate exemplary threshold values provided with respect to rotation of the mobile phone terminal device 100 about the Z axis. FIG. 4(c) illustrates an exemplary case where absolute angles from −30° to −60° about the Z axis with respect to the gravity direction are set as threshold values. FIG. 4(d) illustrates an exemplary case where absolute angles from 30° to 60° about the Z axis with respect to the gravity direction are set as threshold values.

The action determination unit 133 determines the content of an action taken by the user by using both the threshold values set with respect to the X axis direction illustrated in FIGS. 4(a) and 4(b) as well as the threshold values set with respect to the Z axis direction illustrated in FIGS. 4(c) and 4(d). In other words, in the case where acquired data output from the acceleration sensor 132 satisfies both the threshold values for the X axis illustrated in FIG. 4(a) and the threshold values for the Z axis illustrated in FIG. 4(c), it is determined that the user has brought the mobile phone terminal device 100 close to his or her left ear. Also, in the case where acquired data output from the acceleration sensor 132 satisfies both the threshold values for the X axis illustrated in FIG. 4(b) and the threshold values for the Z axis illustrated in FIG. 4(d), it is determined that the user has brought the mobile phone terminal device 100 close to his or her right ear.

Herein, in FIG. 4, an example is given wherein absolute angles with respect to the gravity detection as detected by the acceleration sensor 132 are used in the determination of whether or not the user is trying to place a telephone call, but a configuration is not limited to this technique. For example, it may also be configured such that a determination is made using angles (relative angles) measured within a set amount of time starting from a state wherein the user is using the mobile phone terminal device 100. More specifically, it is determined that the user is trying to place a telephone call in the case where the conditions (1) and (2) given below are satisfied. A "relative angle" refers to the magnitude of angular change from a given angle to a given angle, and in the present embodiment, refers to the magnitude of angular change when the user performs an action of placing the mobile phone terminal device 100 against his or her ear starting from a state wherein the user is holding the mobile phone terminal device 100 in his or her hand. Consequently, it is configured such that threshold values are not provided with respect to X axis rotation. In other words, acquired data in the X axis direction is not used as data for inferring user behavior.

(1) 120° to 180° (left ear) or −120° to −180° relative tilt about the Z axis within a set amount of time (approximately 1.5 s, for example)

(2) −60° to −120° (left ear) or 60° to 120° relative tilt about the Y axis within a set amount of time (approximately 1.5 s, for example)

If a determination is made using "relative angles" in this way, it becomes possible to detect that "the user is trying to place a telephone call", regardless of the orientation of the mobile phone terminal device 100 at the stage prior to the user conducting telephony. For example, it even becomes possible to accommodate a call made while the user is in a horizontal state (lying down).

Figure 7:
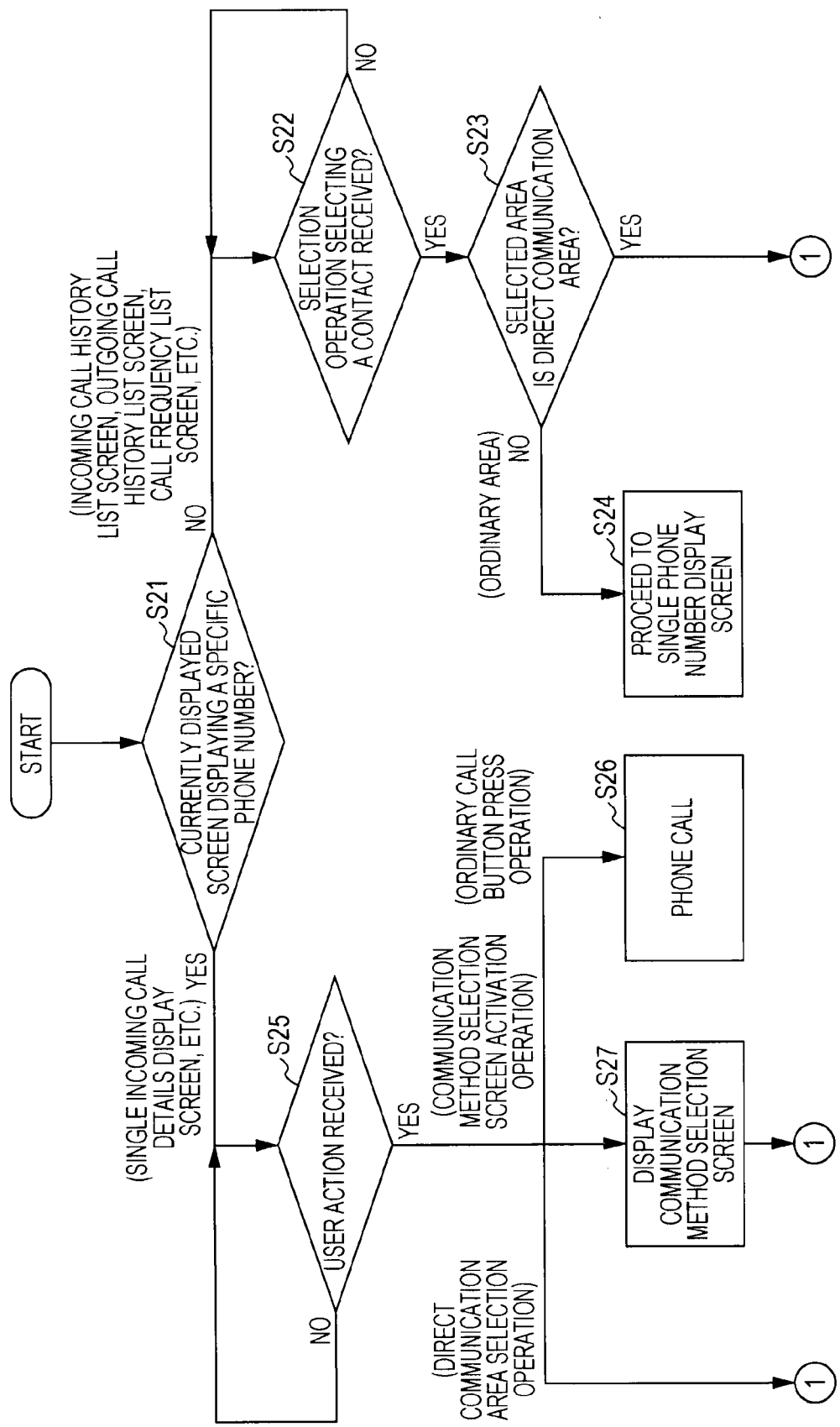
FIG. 7 is a flowchart illustrating exemplary control conducted by a controller in a state where a telephone application has been activated in accordance with an embodiment.

Details of determination and control by the action determination unit 133 will be described later with reference to FIG. 7. Herein, in FIG. 2, the action determination unit 133 and the controller 110 are denoted as separate blocks, but the controller 110 may also be configured to conduct the determination conducted by the action determination unit 133. In other words, the action determination unit 133 and the controller 110 may be configured as a single controller 110.

[2. Exemplary Processing by Controller (Processing Conducted Until a Specific Contact is Selected)]

Next, processing by the controller 110 will be explained with reference to FIGS. 5 to 8. The processing of the controller 110 explained herein refers to processing that determines whether or not a specific communication contact has been selected by the user and supplies the determination results to the action determination unit 133 or controls the behavior of a given application.

Since the content of the processing by the controller 110 differs slightly according to the activated application, an explanation of the processing will be conducted for each application type. First, processing by the controller 110 for the case where a phone book application is activated will be explained with reference to FIG. 5. A phone book application is an application that provides contact address registration, display, and search functions.

Figure 5:
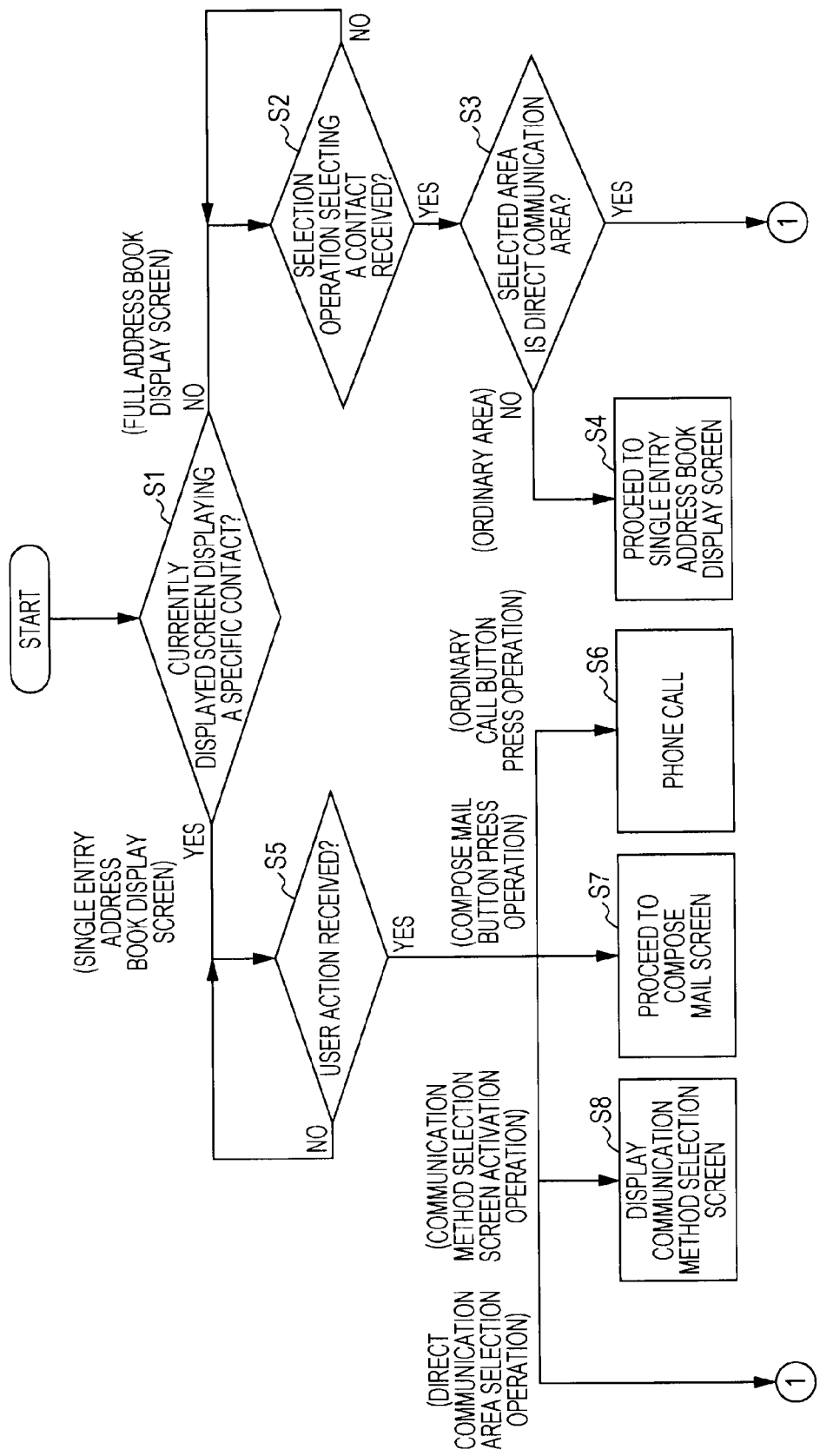
FIG. 5 is a flowchart illustrating exemplary control conducted by a controller in a state where a phone book application has been activated in accordance with an embodiment.

As illustrated in FIG. 5, it is determined by the controller 110 whether or not a screen currently being displayed on-screen on the display unit 106 is a screen displaying a specific contact address item (step S1). In the case where the screen is not a screen wherein a specific contact address item is selected, or in other words, in the case where the screen is a full address book display screen, it is subsequently determined whether or not an operation selecting one of the items has been received (step S2). In the case where such input has not been received, the determination in step S2 is repeated.

In the case where an operation selecting an item has been received, it is determined whether or not the area selected by the operation is the direct communication area Da (step S3). In the case where the selected area was the direct communication area Da, the process proceeds to the connector 1. In the case where the selected area was not the direct communication area Da, or in other words, was an ordinary area, control is conducted to transition to a screen displaying phone book information regarding the selected contact address item (step S4).

Which positions a direct communication area Da and an ordinary area are set to is taken to be freely determinable according to application content, etc. For example, if the application is a phone book application, then as discussed earlier, it is conceivable to set a face display portion for the person at the contact address as the direct communication area Da, and set an area where the person's name is displayed as an ordinary area.

In the case where it is determined in step S1 that the screen currently being displayed on-screen is a screen displaying a specific contact address item, it is determined whether or not some kind of action has been performed by the user (step S5). In the case where no action has been performed, or in other words, in the case where operation input on the touchscreen or an operation moving the mobile phone terminal device 100, etc. has not been performed, the determination in step S5 is repeated.

In the case where it is determined in step S5 that an operation pressing a telephone call button (omitted from illustration) has been received, control is conducted to cause the communication processor 102 to place a telephone call (step S6). In the case where it is determined that an operation pressing a "Compose Mail button" provided for issuing mail composition instructions has been received, control is conducted to transition to a mail composition screen (step S7).

Also, in the case where it is determined that an operation activating a communication method selection screen has been input, control is conducted to display a communication method selection screen (step S8). A "communication method selection screen" is a screen prompting selection of a communication method such as "Reply by Mail" or "Reply by Phone". In the present embodiment, it is configured such that this "communication method selection screen" is displayed in the case where an "Options" button, etc. is pressed while in a state wherein a specific contact address item is displayed on-screen.

Also, in the case where it is determined that an operation selecting (tapping) the direct communication area Da has been received, the process proceeds to the connector 1.

In other words, the process proceeds to the connector 1 in the case where the direct communication area Da is tapped or an operation activating a communication method selection screen is received while in a state where a specific contact address (item) is selected on-screen on the display unit 106. In the case where an operation other than the above is conducted, control is conducted according to the operation content.

Next, processing of the controller 110 while a mail application is activated will be explained with reference to FIG. 6. A mail application is an application that provides mail composition and sending/receiving functions. First, it is determined by the controller 110 whether or not the screen currently being displayed on-screen on the display unit 106 is a screen displaying a specific mail (step S11). In the case where the screen is not a screen displaying a specific mail item, it is subsequently determined whether or not an operation selecting one of the items has been received (step S12). In the case where such input has not been received, the determination in step S12 is repeated. A screen not displaying a specific mail item may be an incoming mail list display screen, a sent mail list display screen, etc.

In the case where it is determined in step S12 that an operation selecting an item has been received, it is determined whether or not the area selected by the operation is a direct communication area Da (step S13). In the case where the selected area was the direct communication area Da, the process proceeds to the connector 1. In the case where the selected area was not the direct communication area Da, or in other words, was an ordinary area, control is conducted to transition to a screen displaying the selected mail item (step S14).

An area displaying a mail icon, etc., for example, may be set as the direct communication area Da, and an area displaying the mail subject, etc. may be set as an ordinary area.

In the case where it is determined in step S11 that the screen currently being displayed on-screen is a screen displaying a specific mail item, it is next determined whether or not some kind of action has been performed by the user (step S15). In the case where no action has been performed, the determination in step S15 is repeated.

In the case where it is determined in step S15 that a "Mail Reply" button for activating a mail reply screen has been pressed, control is conducted to activate a screen for a mail reply (step S16). Also, in the case where it is determined that an operation activating a communication method selection screen has been input, control is conducted to display a communication method selection screen (step S17). In the case where it is determined that an operation selecting (tapping) the direct communication area Da has been received, the process proceeds to the connector 1.

Next, processing of the controller 110 while in a state where a telephone application is activated will be explained with reference to FIG. 7. A telephone application is an application that provides functions for placing and receiving telephone calls. First, it is determined by the controller 110 whether or not the screen currently being displayed on-screen on the display unit 106 is a screen displaying a specific telephone number item (step S21). In the case where the screen is not a screen displaying a specific telephone number item, it is subsequently determined whether or not an operation selecting one the items has been received (step S22). In the case where such input has not been received, the determination in step S22 is repeated. In other words, a screen that is not displaying a specific telephone number item may be an incoming call history list display screen, an outgoing call history list display screen, a call frequency list display screen, etc.

In the case where it is determined in step S22 that an operation selecting an item has been received, it is determined whether or not the area selected by the operation is a direct communication area Da (step S23). In the case where the selected area was a direct communication area Da, the process proceeds to the connector 1. In the case where the selected area was not a direct communication area Da, or in other words, was an ordinary area, control is conducted to transition to a screen displaying the selected telephone number item (step S24).

If the screen is an incoming call history list display screen, then an area displaying a person's facial portrait (or representation), etc., for example, may be set as the direct communication area Da, and an area displaying the person's name, etc. may be set as an ordinary area.

In the case where it is determined in step S21 that the screen currently being displayed on-screen is a screen displaying a specific telephone number item, it is next determined whether or not some kind of action has been performed by the user (step S25). In the case where no action has been performed, the determination in step S25 is repeated. The screen displaying a specific telephone number item may be a details display screen regarding an incoming call item, a details display screen regarding an outgoing call item, etc.

In the case where it is determined in step S25 that a call button for initiating telephony has been pressed, control is conducted to cause the communication processor 102 to conduct telephony control (step S26). Also, in the case where it is determined that an operation activating a communication method selection screen has been input, control is conducted to display a communication method selection screen (step S27). In the case where it is determined that an operation selecting (tapping) the direct communication area Da has been received, the process proceeds to the connector 1.

Next, processing of the controller 110 while in a state where a standby application is activated will be explained with reference to FIG. 8. A standby application is an application that is continuously active during what is called a standby period. Functions provided by the standby application include receiving telephone calls and mails, updating SNS or other services, and issuing notifications to the user as "incoming events".

First, it is determined by the controller 110 whether or not some kind of incoming event has occurred (step S31). The determination in step S31 is repeated as long as an incoming event does not occur. In the case where an incoming event is detected, control is conducted to display a screen indicating its content on-screen on the display unit 106 (step s32). Then, it is determined whether or not the content of the incoming event was an incoming telephone call (step S33). In the case where the incoming event was an incoming telephone call, it is determined whether or not an operation selecting the display area of the incoming event has been received (step S34). In the case where an operation selecting the display area of the incoming event has not been received, the determination in step S34 is repeated.

In the case where an operation selecting the display area of the incoming even is received, it is determined whether or not the selected area is a direct communication area Da (step S35). In the case where the selected area was a direct communication area Da, the process proceeds to the connector 1. In the case where the selected area was not a direct communication area Da, or in other words, was an ordinary area, control is conducted to transition to an incoming event display screen, in this case an incoming telephone call item display screen (step S36).

An area displaying a telephone icon, etc. may be set as a direct communication area Da, and an area displaying the name of the calling party, etc. may be set as an ordinary area, for example.

In the case where an incoming event is detected in step S31 and the event is a service update notification, it is determined whether or not an operation selecting the display area of the incoming event has been received (step S37). In the case where an operation selecting the display area of the incoming event has not been received, the determination in step S37 is repeated. What is called a service herein refers to an SNS such as Facebook (registered trademark) or a service such as Twitter (registered trademark), for example.

In the case where an operation selecting the display area of the incoming event is received, it is determined whether or not the selected area is a direct communication area Da (step S38). In the case where the selected area was a direct communication area Da, the process proceeds to the connector 1. In the case where the selected area was not a direct communication area Da, or in other words, was an ordinary area, control is conducted to transition to an incoming event display screen, in this case a service update notification item display screen (step S39).

An area displaying an icon indicating a service, etc. may be set as a direct communication area Da, and an area displaying the name of the party who updated the service may be set as an ordinary area, for example.

In the case where an incoming event is detected in step S31 and the event is an incoming mail, it is determined whether or not an operation selecting the display area of the incoming event has been received (step S40). In the case were an operation selecting the display area of the incoming event has not been received, the determination in step S40 is repeated.

In the case where an operation selecting the display area of the incoming event is received, it is determined whether or not the selected area is a direct communication area Da (step S41). In the case where the selected area was a direct communication area Da, the process proceeds to the connector 1. In the case where the selected area was not a direct communication area Da, or in other words, was an ordinary area, control is conducted to transition to an incoming event display screen, in this case a received mail item display screen (step S42).

[3. Exemplary Processing by Action Determination Unit (Processing Conducted after a Specific Contact is Selected)]

Next, processing by the action determination unit 133 will be explained with reference to FIGS. 9 and 10. Processing by the action determination unit 133 is conducted in the case where the connector 1 is selected in the respective processes illustrated in FIGS. 5 to 8. In other words, processing by the action determination unit 133 is initiated in the case where a direct communication area Da is tapped or when an operation activating a communication method selection screen is received while in a state where a specific contact address (item) on-screen on the display unit 106.

The action determination unit 133 first determines whether or not the acceleration sensor 132 has detected rotation of the mobile phone terminal device 100 within a set amount of time during a set amount of time after a direct communication area Da is tapped or an operation activating a communication method selection screen is received (step S51). In other words, it is determined if, after there was an operation selecting a specific contact by the user, the magnitude of displacement detected by the acceleration sensor 132 was in the range illustrated by example in FIG. 4. In the case where the orientation of the mobile phone terminal device 100 is within the range of predetermined threshold values, it can be inferred that the user has performed an action of bringing the mobile phone terminal device 100 close to his or her ear and is trying to place a telephone call.

In the case where rotation of the mobile phone terminal device 100 is detected in step S51, it is next determined whether or not the proximity sensor 131 has detected an object (step S52). In other words, it is determined whether or not the user has performed an action of bringing the mobile phone terminal device 100 up to his or her ear. An object will be detected by the proximity sensor 131, in the case where the mobile phone terminal device 100 is disposed near the user's ear. In the case where it is determined in step S52 that an object was not detected, the process proceeds to the connector 2.

In the case where an object was not detected by the proximity sensor 131 in step S52, the process proceeds to the connector 2. In the case where an object was detected by the proximity sensor 131, it is next determined if the number of registered telephone number items for the selected specific contact is only one item (step S53). In the case where the number of registered telephone number items is only one item, control is conducted to place a telephone call with the registered telephone number as the recipient (step S54).

In the case where the number of registered telephone number items is multiple items, it is determined whether or not priorities (an order of priority) are set for the multiple registered telephone numbers (step S55). In the case where there are priority settings, control is conducted to place a telephone call with the telephone number set with the highest priority from among the multiple registered telephone numbers as the recipient (step S56). In the case where there are no priority settings, control is conducted to place a telephone call with the telephone number having the highest usage frequency from among the multiple registered telephone numbers as the recipient (step S57).

Next, processing from the connector 2 onward will be explained with reference to FIG. 10. There are two patterns as discussed above in which the connector 2 is selected. The first is the pattern in which a direct communication area Da is selected or an operation activating a communication method selection screen (or other operation selecting a specific contact) is received, but in which an object is not detected by the proximity sensor 131. The other is the pattern in which an operation selecting a specific contact is received and an object is also detected by the proximity sensor 131, but in which the magnitude of displacement detected by the acceleration sensor 132 is out of a given range. In other words, the above are cases where a specific contact is selected, but where it is assumed that the user has not performed an action of bringing the mobile phone terminal device 100 close to his or her ear.

In such cases, the action determination unit 133 determines what means is most frequently taken as the means for contacting the selected specific contact (step S61). In the example illustrated in FIG. 10, cases where the means ordinarily used to contact a specific contact via the mobile phone terminal device 100 are "Mail", "Chat", and "(SNS or other) Service" are given by example.

In the case where the means most frequently taken to contact the selected specific contact is "Service", control is conducted to activate the service and then transition to a message composition screen (step S62). In the case where the most frequently taken contacting means is "Chat", control is conducted to transition to a screen with a window for chatting launched (step S63).

In the case where the means most frequently taken to contact the selected specific contact is "Mail", it is next determined if the number of registered mail address items for the selected specific contact is only one item (step S64). In the case where the number of registered mail address items was only one item, control is conducted to transition to a mail composition screen with the registered mail address as the recipient (step S65).

In the case where the number of registered mail address items is multiple items, it is determined whether or not priorities (an order of priority) are set for the multiple registered mail addresses (step S66). In the case where there are priority settings, control is conducted to transition to a mail composition screen with the mail address set with the highest priority from among the multiple registered mail addresses as the recipient (step S67). In the case where there are no priority settings, control is conducted to transition to a mail composition screen with the mail address having the highest usage frequency from among the multiple registered mail addresses as the recipient (step S68).

According to the embodiment discussed above, a telephone call is automatically placed in the case where an object was detected by the proximity sensor 131 and the magnitude of displacement acquired by an acceleration sensor 132 was a given magnitude while in a state where a specific contact has been selected by tapping the screen of the display unit 106. Also, contact is conducted using the means most frequently taken as the means (textual communication means) for contacting a specific contact in the case where an object was not detected by the proximity sensor 131 or the magnitude of displacement acquired by the acceleration sensor 132 was not a given magnitude while in a state where a specific contact has been selected.

Figure 11A:
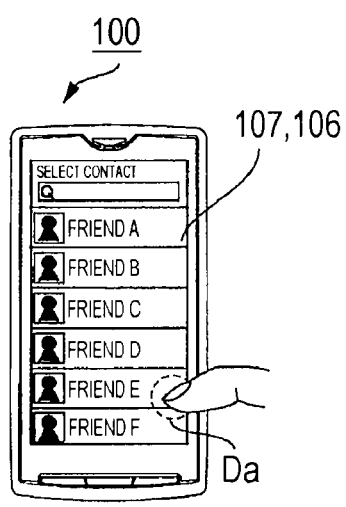
FIG. 11 is an explanatory diagram illustrating an example from a state where a phone book application is displayed on-screen to when telephony is initiated or when an electronic mail application is activated in accordance with an embodiment, with (a) illustrating an exemplary state where a specific contact is selected on a phone book application screen, (b) illustrating an exemplary state where telephony is initiated, and (c) illustrating an example wherein an electronic mail composition screen is displayed.

These behaviors will now be explained from the perspective of operations input by the user and with reference to FIGS. 11 to 14. As illustrated in FIG. 11(a), while in a state where a phone book is displayed on the display unit 106 of the mobile phone terminal device 100, the display area of a specific person therefrom (Friend E in FIG. 11(a)) is taken to be tapped by the user. In this case, "Yes" is selected in step S2 ("operation selecting one of the items has been received?") of the flowchart illustrated in FIG. 5, and it is next determined whether or not the tapped area is a direct communication area Da (step S3).

Figure 11B:
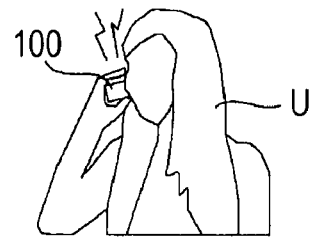
Figure 11C:
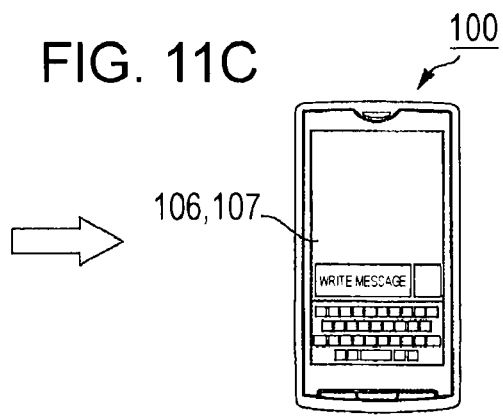

In the example illustrated in FIG. 11(a), the area tapped by the user is taken to be an area set as a direct communication area Da. Consequently, the process proceeds to the connector 1. Then, in step S51 of FIG. 9, it is determined whether or not the proximity sensor 131 has detected an object during a set amount of time. As illustrated in FIG. 11(b), "Yes" is selected in step S51 in the case where the user U has performed an action of bringing the mobile phone terminal device 100 close to his or her ear. Then, in the next step S52, it is determined whether or not the acceleration sensor 132 has detected rotation of the mobile phone terminal device 100. As illustrated in FIG. 11(b), "Yes" is selected in step S52 in the case where the user U is holding the mobile phone terminal device 100 at a tilt. After that, a telephone call is automatically placed to the telephone number of the specified contact (Friend E).

Figure 9:
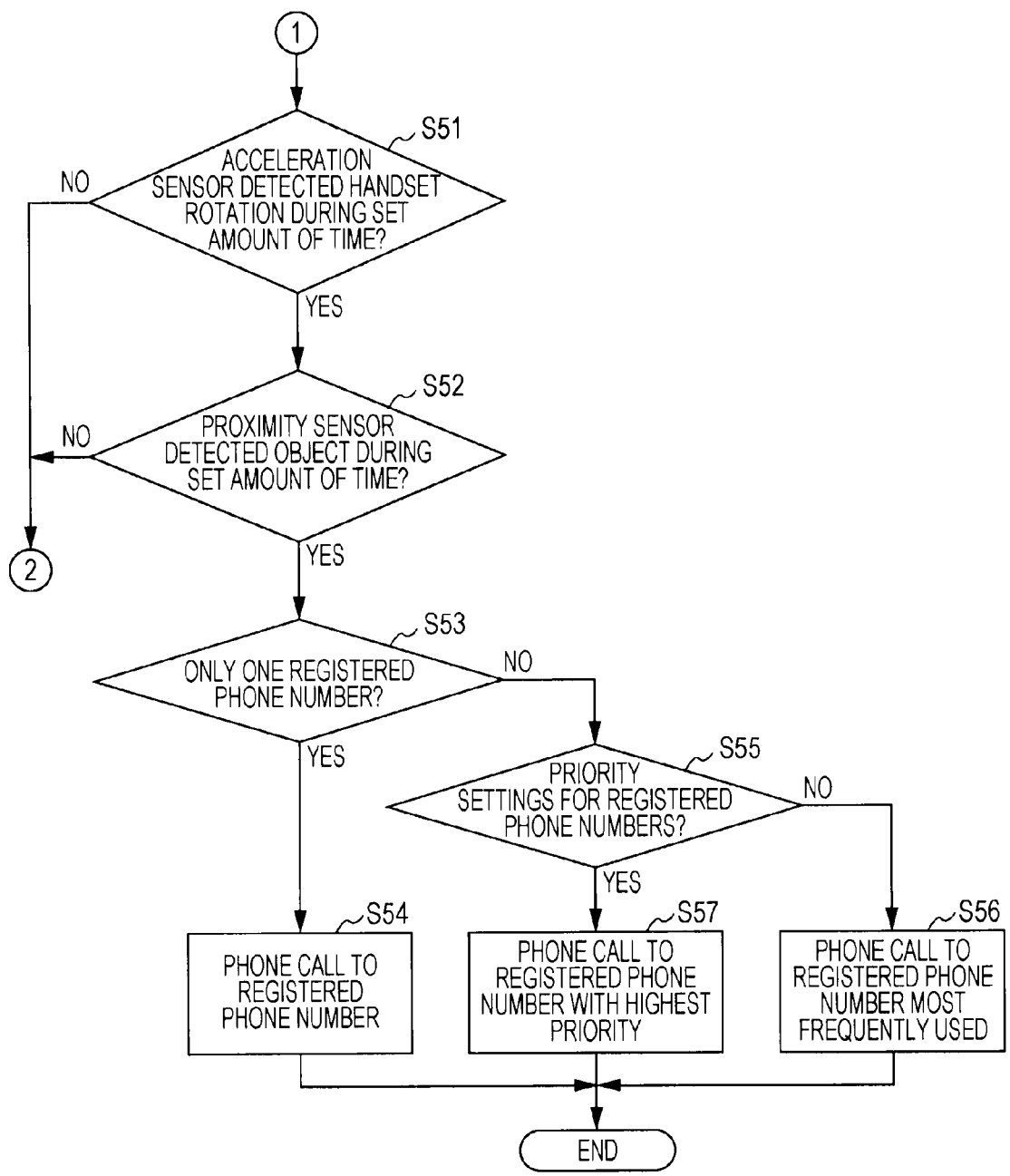
FIG. 9 is a flowchart illustrating exemplary processing by an action determination unit in accordance with an embodiment.
Figure 10:
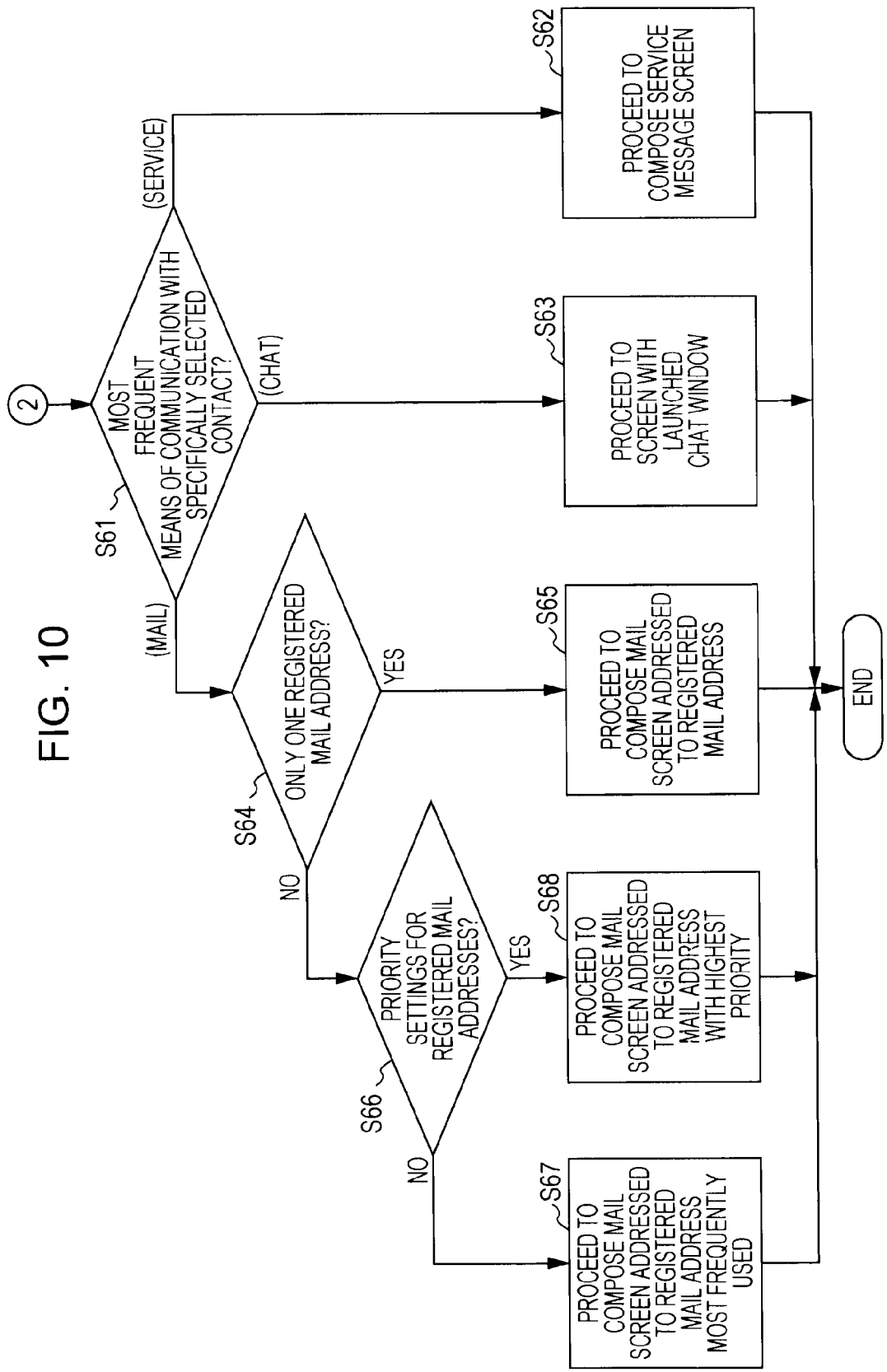
FIG. 10 is a flowchart illustrating exemplary processing by an action determination unit in accordance with an embodiment.

From the state illustrated in FIG. 11(a), "No" is selected in step S51 or step S52 in FIG. 9 in the case where such an action by the user U was not detected, and the process proceeds to the connector 2. Then, following the flowchart illustrated in FIG. 10, the means most frequently taken as the means for contacting the selected specified contact is selected, and the screen automatically transitions to a screen in accordance with the means (see FIG. 11(c)). The example illustrated in FIG. 11(c) assumes the case where the most-used means for contacting the specific contact is mail. For this reason, a mail composition screen is displayed on-screen on the display unit 106 of the mobile phone terminal device 100.

FIG. 12 illustrates an example wherein, starting from a state in which an "Incoming Mail List" is displayed on the display unit 106, a telephone call is automatically placed, or, a screen in accordance with the most frequently used means for communicating with a specific contact is displayed.

Figure 12A:
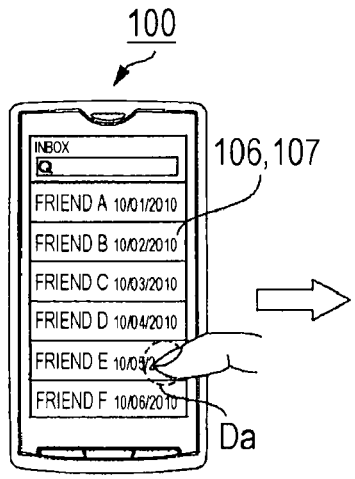
FIG. 12 is an explanatory diagram illustrating an example from a state where a list of incoming mail is displayed on-screen to when telephony is initiated or when an electronic mail application is activated in accordance with an embodiment, with (a) illustrating an exemplary state where a list of incoming mail is displayed on-screen, (b) illustrating an exemplary state where a specific item is selected from the list, and (c) illustrating an exemplary state where telephony is initiated, and (d) illustrating an example wherein an electronic mail composition screen is displayed.
Figure 12B:
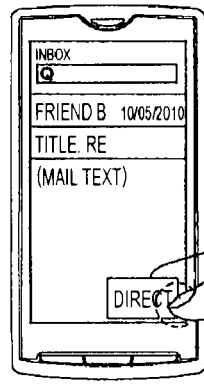

FIG. 12(a) illustrates a state wherein an incoming mail list is being displayed on-screen on the display unit 106. It is assumed that the user has tapped the on-screen display area of a "Friend B". FIG. 12(b) illustrates an exemplary screen displayed after a tap by the user U is received, in which a screen indicating details of an incoming mail from "Friend B" is being displayed. While in a state where this screen is displayed, it is assumed that a software key displayed as "Direct" and positioned in the lower-right of the screen is tapped by the user U. Additionally, it is assumed that the display area of this software key is an area that has been set as a direct communication area Da.

Figure 6:
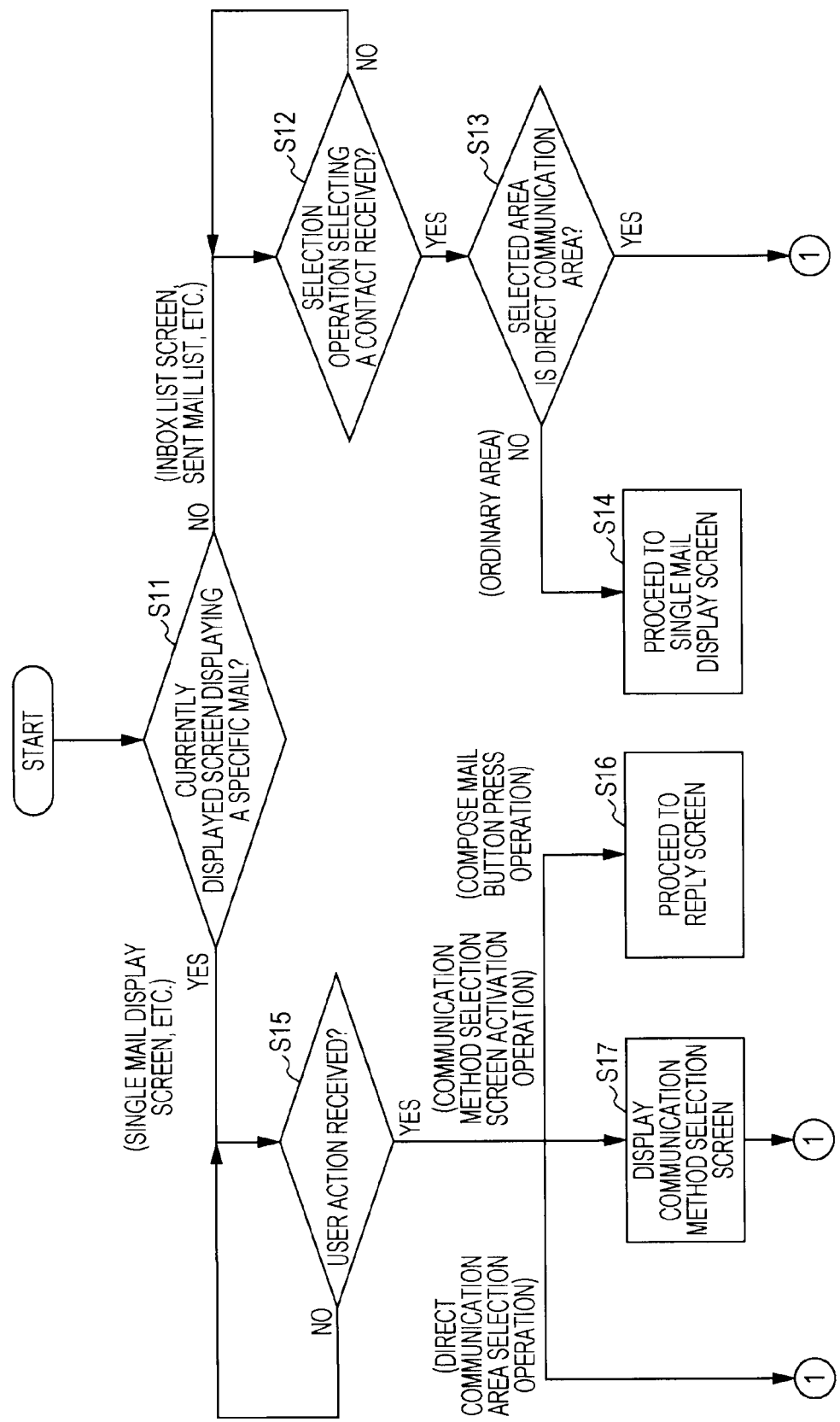
FIG. 6 is a flowchart illustrating exemplary control conducted by a controller in a state where an electronic mail application has been activated in accordance with an embodiment.

In this case, "Yes" is selected in both step S12 and step S13 of the flowchart in FIG. 6, and the process proceeds to the processing of the connector 1. Since the processing from the connector 1 onward is similar to the processing explained with reference to FIG. 11, explanation referencing the flowchart is omitted.

Figure 12C:
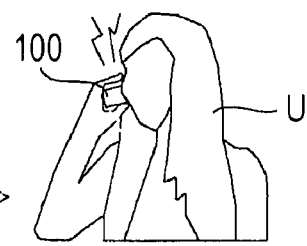
Figure 12D:
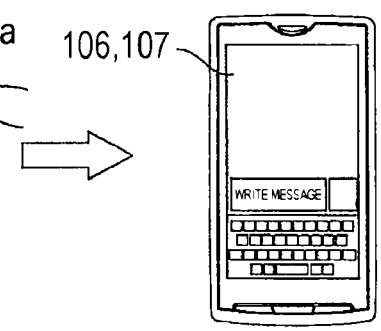

As illustrated in FIG. 12(c), in the case of detecting an action wherein the user brings the mobile phone terminal device 100 close to his or her ear, or in other words, an action of trying to place a call, a telephone call is placed to that contact (Friend B). Also, in the case where no action was detected for a set amount of time after an operation selecting a specific contact was performed by the user U, the most-used means for communicating with the selected specific contact is automatically selected and a screen in accordance with that means is displayed, as illustrated in FIG. 12(d). FIG. 12(d) illustrates an example wherein a mail composition screen is displayed.

FIG. 13 illustrates an example wherein, starting from a state in which an "Incoming Mail Notification" is displayed on the display unit 106 as a notification of an incoming event, a telephone call is automatically placed, or, a screen in accordance with the most frequently used means for communicating with a specific contact is displayed.

Figure 13A:
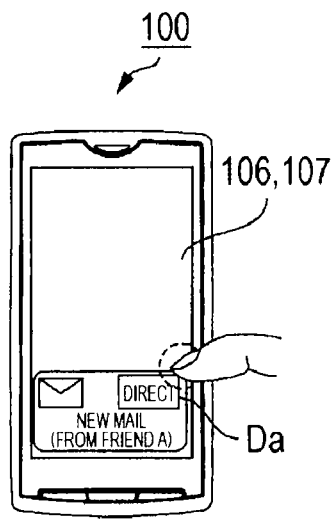
FIG. 13 is an explanatory diagram illustrating an example from a state where an incoming electronic mail notification is displayed on-screen to when telephony is initiated or when an electronic mail application is activated in accordance with an embodiment, with (a) illustrating an exemplary state where an incoming electronic mail notification is displayed on-screen, (b) illustrating an exemplary state where telephony is initiated, and (c) illustrating an example wherein an electronic mail composition screen is displayed.

FIG. 13(a) illustrates a state wherein an "Unread Mail (from Friend A)" message informing the user that mail was received is being displayed on-screen on the display unit 106. A software key displayed as "Direct" is positioned to the upper-right of the "Unread Mail" message. It is assumed that the display area of this software key is an area that has been set as a direct communication area Da.

Figure 8:
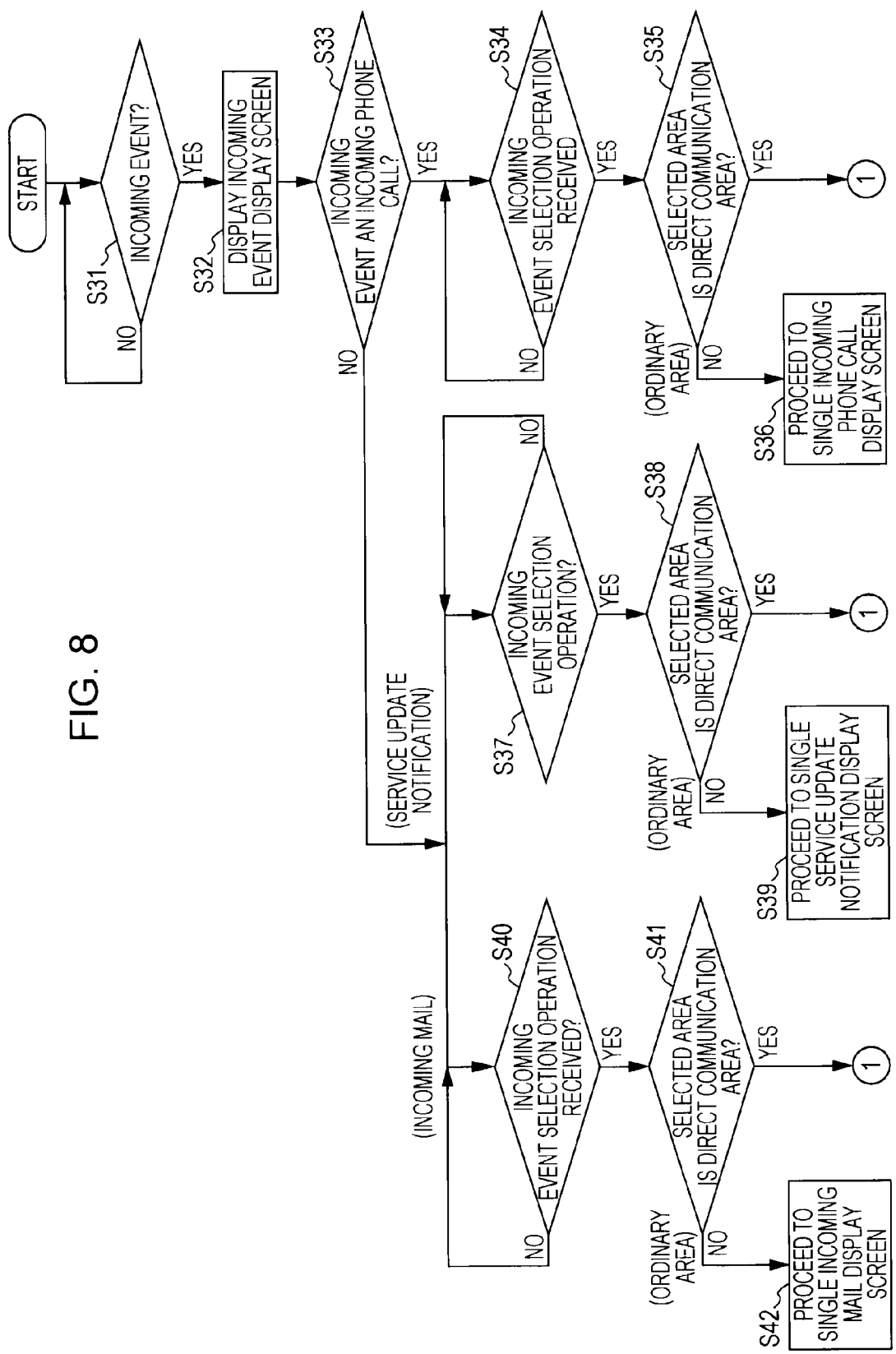
FIG. 8 is a flowchart illustrating exemplary control conducted by a controller in a state where a standby application has been activated in accordance with an embodiment.

If this direct communication area Da is tapped by the user, then "Yes" is selected in both step S40 and step S41 of the flowchart in FIG. 8, and the process proceeds to the processing of the connector 1. Since the processing from the connector 1 onward is similar to the processing explained with reference to FIG. 11, explanation referencing the flowchart is omitted.

Figure 13B:
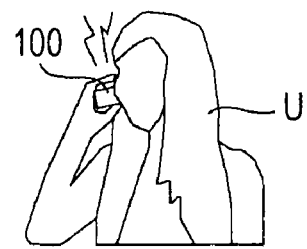
Figure 13C:
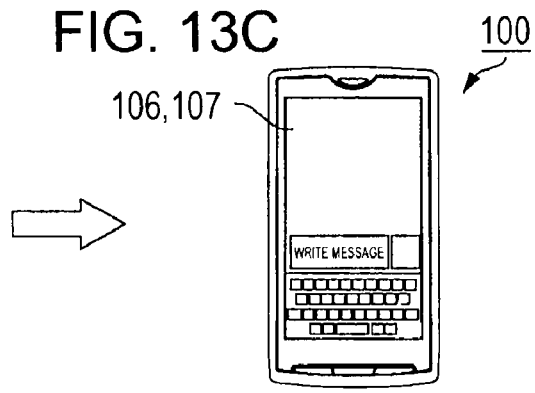

As illustrated in FIG. 13(b), in the case of detecting an action wherein the user brings the mobile phone terminal device 100 close to his or her ear, or in other words, an action of trying to place a call, a telephone call is placed to that contact (the mail sender: Friend A). Also, in the case where no action was detected for a set amount of time after an operation selecting a specific contact was performed by the user U, the most-used means for communicating with the selected specific contact is automatically selected and a screen in accordance with that means is displayed, as illustrated in FIG. 13(c). FIG. 13(c) illustrates an example wherein a mail composition screen is displayed.

FIG. 14 illustrates an example wherein, starting from a state in which an "Incoming Call Notification" is displayed on the display unit 106 as a notification of an incoming event, a telephone call is automatically placed, or, a screen in accordance with the most frequently used means for communicating with a specific contact is displayed.

Figure 14A:
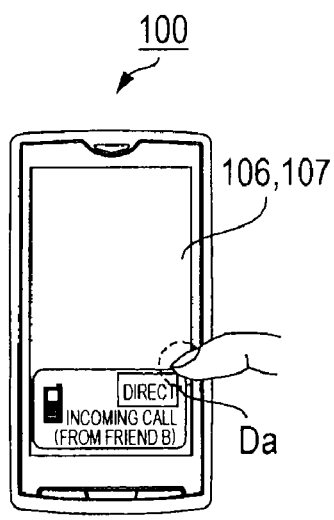
FIG. 14 is an explanatory diagram illustrating an example from a state where an incoming call notification is displayed on-screen to when telephony is initiated or when a mail application is activated in accordance with an embodiment, with (a) illustrating an exemplary state where an incoming call notification is displayed on-screen, (b) illustrating an exemplary state where telephony is initiated, and (c) illustrating an example wherein an electronic mail composition screen is displayed.

FIG. 14(a) illustrates a state wherein an "Incoming Call (from Friend B)" message informing the user that a telephone call was received is being displayed on-screen on the display unit 106. A software key displayed as "Direct" is positioned to the upper-right of the "Incoming Call" message. It is assumed that the display area of this software key is an area that has been set as a direct communication area Da.

If this direct communication area Da is tapped by the user, then "Yes" is selected in both step S40 and step S41 of the flowchart in FIG. 8, and the process proceeds to the processing of the connector 1. Since the processing from the connector 1 onward is similar to the processing explained with reference to FIG. 11, explanation referencing the flowchart is omitted.

Figure 14B:
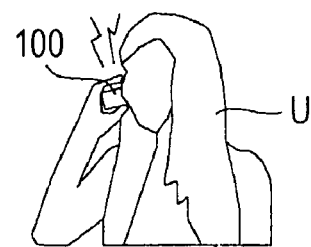
Figure 14C:
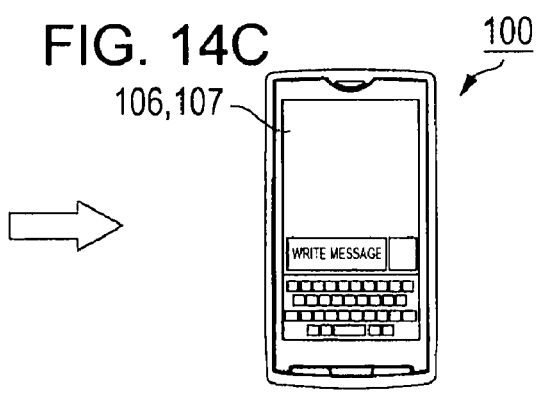

As illustrated in FIG. 14(b), in the case of detecting an action wherein the user brings the mobile phone terminal device 100 close to his or her ear, or in other words, an action of trying to place a call, a telephone call is placed to that contact (the caller: Friend B). Also, in the case where no action was detected for a set amount of time after an operation selecting a specific contact was performed by the user U, the most-used means for communicating with the selected specific contact is automatically selected and a screen in accordance with that means is displayed, as illustrated in FIG. 14(c). FIG. 14(c) illustrates an example wherein a mail composition screen is displayed.

In other words, according to the present embodiment, in the case of detecting an action wherein the user brings the mobile phone terminal device 100 close to his or her ear, or in other words, an action of trying to place a call after an operation selecting a specific contact has been performed by the user U, a telephone call is placed to that contact. Also, in the case where no action was detected for a set amount of time after an operation selecting a specific contact has been performed by the user U, the most-used means for communicating with the selected specific contact is automatically selected and a screen in accordance with that means is displayed.

By configuring and processing in this way, the user becomes able to place a telephone immediately in the case where he or she wants to call a specific contact, simply by performing an action of selecting the specific contact on-screen and then performing an action of bringing the mobile phone terminal device 100 close to his or her ear. Also, in the case of wanting to communicate with a specific contact by means other than a telephone call, a suitable application (textual communication means) is automatically launched as a result of the user performing an operation selecting the specific contact and then briefly holding the mobile phone terminal device 100 without action. A screen set with the intended contact as the recipient is then displayed. In other words, according to the present embodiment, the steps a user must take can be reduced in the case of wanting to communicate with a specific contact using the mobile phone terminal device 100.

[4. Various Modifications]

Herein, in the embodiment discussed above, although an example is given wherein a proximity sensor 131 is provided separately from a display unit 106 configured as a touchscreen, a touchscreen may also be configured for use as a proximity sensor. Furthermore, not only a capacitive type, but also a pressure-sensitive type that detects object contact by sensing changes in pressure, for example, may be used as the touchscreen type. In the case of using a pressure-sensitive touchscreen, it is determined that the user U is trying to place a telephone call once an object directly contacts the touchscreen.

Also, in the embodiment discussed above, although an example of configuring a display unit 106 using a touchscreen is illustrated, an embodiment is not limited thereto. For example, a panel not equipped with touchscreen functions may also be used for the display unit 106. In this case, an operation selecting a specific contact is also conducted via an operation unit 107 consisting of buttons, etc.

Also, in the embodiment discussed above, although an example is given wherein an acceleration sensor is used as a displacement detector that detects displacement in the orientation of the mobile phone terminal device 100, another sensor able to detect tilt, such as a geomagnetic sensor, etc. may also be used.

Also, in the embodiment discussed above, although an example is given wherein the means most frequently taken to communication with a specific contact is selected in the case where an action by the user U was not detected after an operation selecting a specific contact was performed by the user U, an embodiment is not limited thereto. It may also be configured such that the active application at the time of selecting a specific contact is used to communicate with the specific contact. For example, it may be configured such that mail is automatically selected as the communication means in the case where a direct communication area Da is selected on an incoming mail details display screen, as illustrated in FIG. 12(b).

Also, in the embodiment discussed above, although telephone calls, mail, SNS and other services, Twitter, and chat are given as examples of means for communicating with a specific contact, an embodiment is not limited thereto. Any means is acceptable as long as it is a means by which communication with a specific contact is realizable.

Also, in the embodiment discussed above, although an example is given wherein a mobile terminal device is applied to a mobile phone terminal device, an embodiment is not limited thereto. As long as a device is a terminal having telephony functions and/or communication functions, it may also be applied to portable devices such as PDAs (PDA: Personal Digital Assistant), portable game consoles, digital camera devices, etc. Advantages similar to those discussed earlier can be obtained in all cases.

Also, configurations and processes stated in the claims are not limited to the exemplary embodiment discussed above. It should be understood as obvious by those skilled in the art that various modifications, combinations, and other embodiments may occur depending on design requirements and other factors insofar as they are within the scope of the appended claims or the equivalents thereof.

REFERENCE SIGNS LIST

100: mobile phone terminal device
101: antenna

102: communication processor
103: audio processor
104: speaker
105: microphone
106: display unit
107: operation unit
108: memory
110: controller
121: control line
122: data line
131: proximity sensor
132: acceleration sensor
133: action determination unit

What is claimed is:

1. A mobile terminal device comprising:
a communication processor that conducts wireless communication processing;
an operation unit that receives an instruction input from a user for selecting a communication contact;
a displacement detector that detects a magnitude of displacement in orientation of the mobile terminal device; and
a controller that causes the communication processor to conduct the wireless communication with the selected communication contact according to the detected magnitude of displacement,
wherein the controller causes the communication processor to conduct the wireless communication with the selected communication contact based on whether the magnitude of displacement detected by the displacement detector is within a predetermined range of given magnitudes of displacement, and
when the magnitude of displacement detected by the displacement detector is not within the predetermined range of given magnitudes of displacement, the displacement detector determines that the user has not brought the mobile terminal device up to an ear of the user, and the controller causes the communication processor to automatically conduct the wireless communication as an electronic message.

2. The mobile terminal device according to claim 1, wherein when the magnitude of displacement detected by the displacement detector is within the predetermined range of given magnitudes of displacement, the displacement detector determines that the user has brought the mobile terminal device up to an ear of the user, and the controller causes the communication processor to automatically conduct the wireless communication as a telephone call with the selected communication contact.

3. The mobile terminal device according to claim 2, wherein when there are multiple telephone numbers stored for the selected communication contact, the controller causes the communication processor to conduct the telephone call using a telephone number set with a highest priority among the multiple telephone numbers.

4. The mobile terminal device according to claim 2, wherein when there are multiple telephone numbers stored for the selected communication contact, the controller causes the communication processor to conduct the telephone call using a telephone number having a highest usage frequency from among the multiple telephone numbers.

5. The mobile terminal device according to claim 1, wherein when there are multiple destination addresses stored for the selected communication contact, the controller causes the communication processor to send the electronic message using a destination address set with a highest priority among the multiple destination addresses.

6. The mobile terminal device according to claim 1, wherein when there are multiple destination addresses stored for the selected communication contact, the controller causes the communication processor to send the electronic message using a destination address having a highest usage frequency from among the multiple destination addresses.

7. The mobile terminal device according to claim 1, wherein the mobile terminal device is configured to perform a plurality of applications for sending an electronic message, and when the displacement detector determines that the user has not brought the mobile terminal device up to an ear of the user the controller causes the communication processor to automatically conduct the wireless communication as an electronic message using the most frequently used application of the plurality of applications.

8. The mobile terminal device according to claim 1, wherein the controller causes the displacement detector to detect the magnitude of displacement within a given amount of time starting after the communication contact is selected.

9. The mobile terminal device according to claim 1, further comprising:
a proximity sensor for detecting the user's proximity,
wherein the controller causes the wireless communication according to detecting the change of displacement in orientation of the mobile terminal device and the user's proximity detected by the proximity sensor.

10. The mobile terminal device according to claim 9, further comprising:
an acceleration sensor that acquires rotational angles about a plurality of rotational axes of the mobile terminal device for detecting the change of displacement in orientation of the mobile terminal device.

11. The mobile terminal device according to claim 10, wherein the displacement detector determines that the user has brought the mobile terminal device up to an ear of the user based on the detection results of the proximity sensor and the acquired rotational angles of the acceleration sensor.

12. The mobile terminal device according to claim 1, further comprising:
a display unit that displays a list of communication contacts for selection by the input operation unit.

13. A communication method, implemented on a mobile terminal device, comprising:
receiving an instruction input from a user for selecting a communication contact;
detecting a magnitude of displacement in orientation of the mobile terminal device; and
causing the mobile terminal device to conduct wireless communication with the selected communication contact according to the detected magnitude of displacement,
wherein the causing includes causing the mobile terminal device to conduct the wireless communication with the selected communication contact based on whether the magnitude of displacement detected is within a predetermined range of given magnitudes of displacement, and
when the magnitude of displacement detected is not within the predetermined range of given magnitudes of displacement, determining that the user has not brought the mobile terminal device up to an ear of the user, and the causing the mobile terminal device to automatically conduct the wireless communication as an electronic message.

14. A non-transitory computer readable storage medium that stores a program, which when executed by a mobile terminal device, causes the mobile terminal device to perform a method comprising:
   receiving an instruction input from a user for selecting a communication contact;
   detecting a magnitude of displacement in orientation of the mobile terminal device; and
   causing the mobile terminal device to conduct wireless communication with the selected communication contact according to the detected magnitude of displacement,
   wherein the causing includes causing the mobile terminal device to conduct the wireless communication with the selected communication contact based on whether the magnitude of displacement detected is within a predetermined range of given magnitudes of displacement, and
   when the magnitude of displacement detected is not within the predetermined range of given magnitudes of displacement, determining that the user has not brought the mobile terminal device up to an ear of the user, and the causing the mobile terminal device to automatically conduct the wireless communication as an electronic message.

* * * * *